Feb. 21, 1956     H. W. HAPMAN     2,735,534
FLIGHT CONVEYOR
Filed Sept. 10, 1951     2 Sheets-Sheet 1
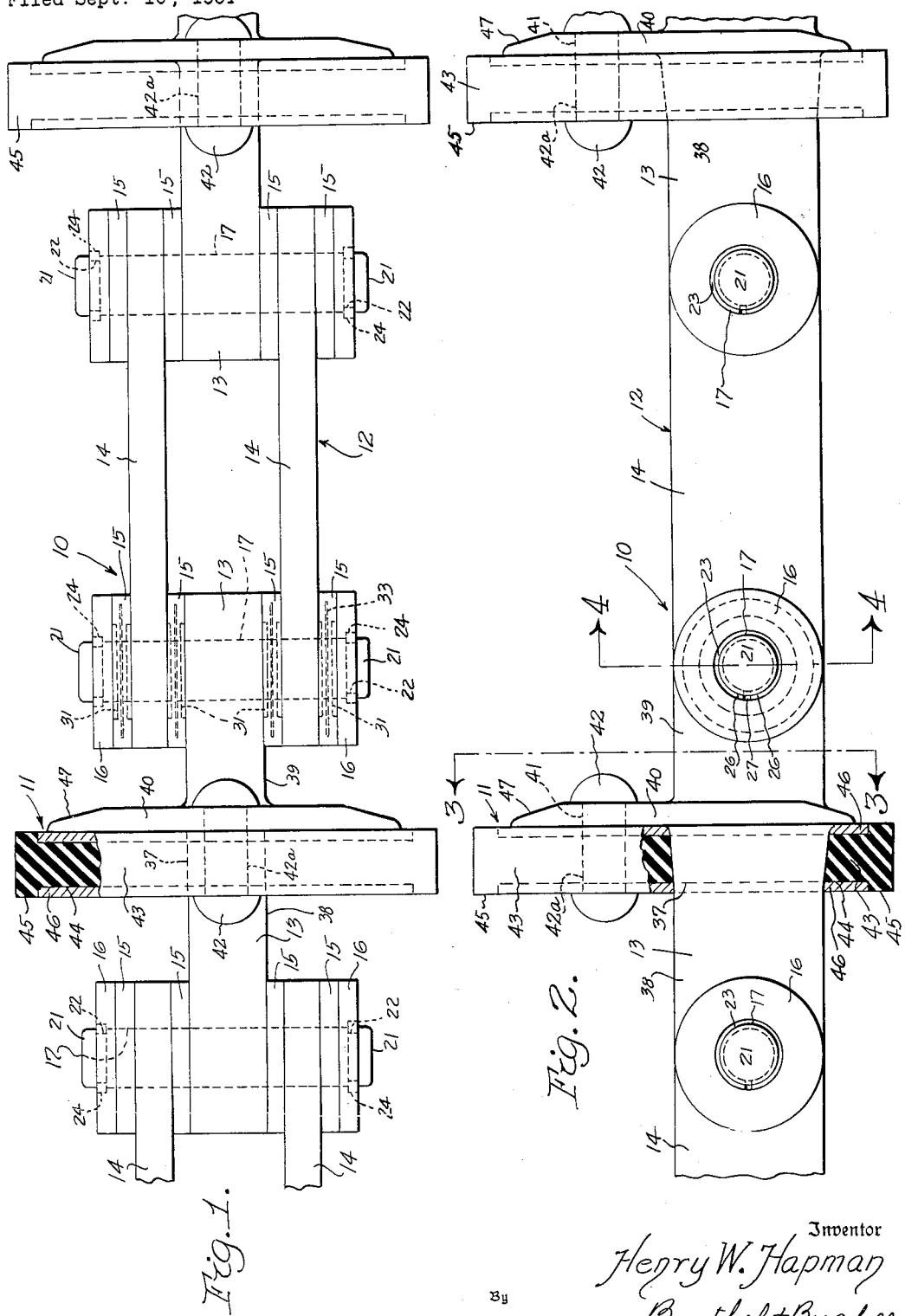
Inventor
Henry W. Hapman
Barthel & Bugbee
Attorneys Feb. 21, 1956  H. W. HAPMAN  2,735,534
FLIGHT CONVEYOR
Filed Sept. 10, 1951  2 Sheets-Sheet 2
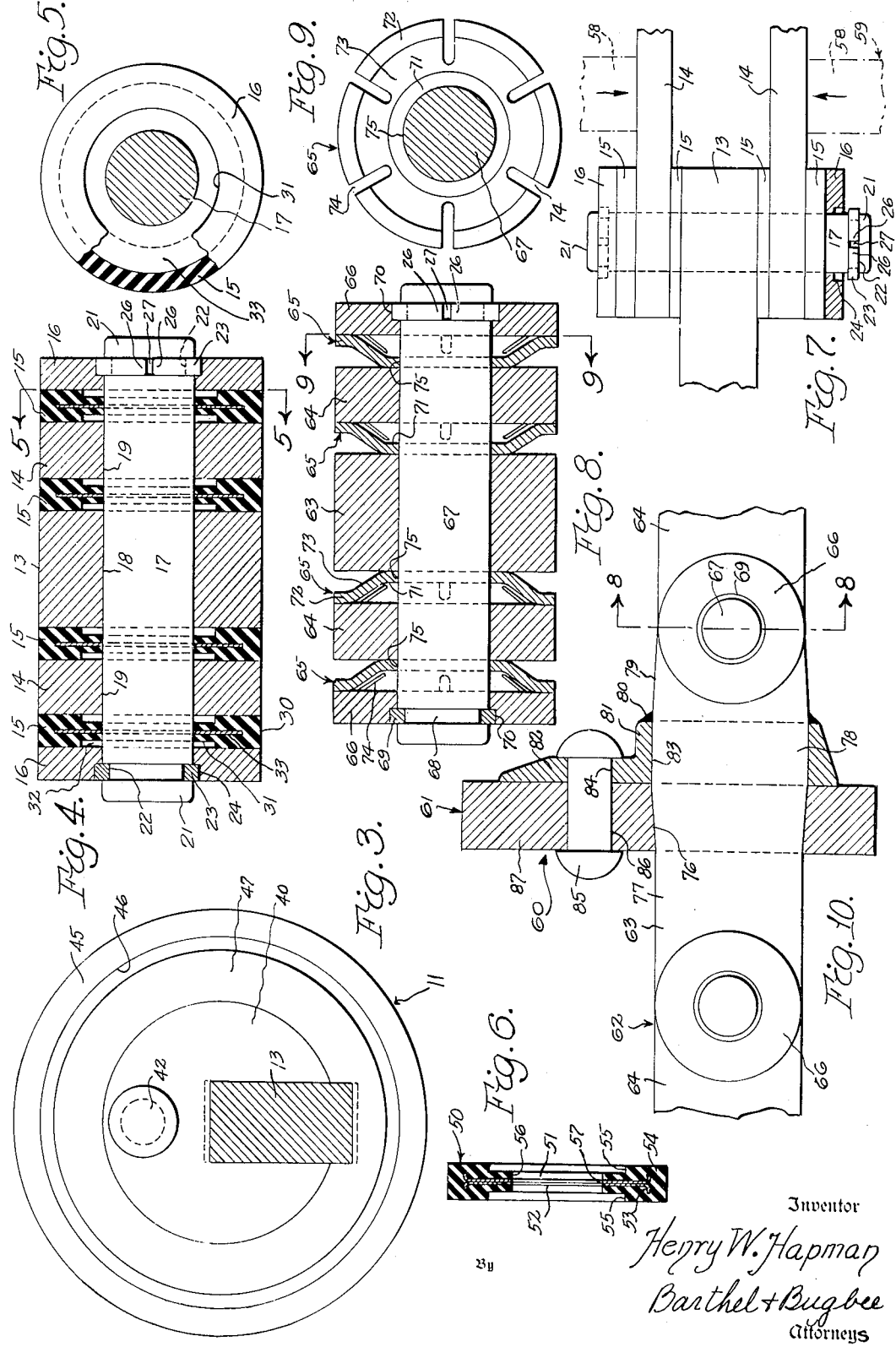
Inventor
Henry W. Hapman
Barthel + Bugbee
Attorneys

United States Patent Office 2,735,534
Patented Feb. 21, 1956

2,735,534

FLIGHT CONVEYOR

Henry W. Hapman, Hickory Corners, Mich., assignor of forty per cent to Hannah Jane Hapman, Hickory Corners, Mich.

Application September 10, 1951, Serial No. 245,922

3 Claims. (Cl. 198—176)

This invention relates to conveyors and, in particular, to flight conveyors.

One object of this invention is to provide a flight conveyor wherein the junction between the flight and the conveyor chain link to which it is attached is provided with a special tight sealing arrangement which not only seals the junction against loss of pressure in a pressurized system but also prevents the lodging of particles of the material conveyed as well as bacteria or insect eggs or the like, this feature being especially valuable in the conveying of food and chemical products, especially where the conveying is accompanied by treatment under gas or steam pressure.

Another object is to provide a flight conveyor of the foregoing character wherein the conveyor is substantially free from extraneous projections or recesses to which the conveyed material can cling, this freedom from such projections enabling the conveyor to be easily cleaned and kept clean.

Another object is to provide a flight conveyor of the foregoing character wherein the connection between the flight and the conveyor chain link on which it is mounted is made by means of mating internal and external tapers which provide a tight junction and strong connection.

Another object is to provide a flight conveyor wherein the joints between the links of the conveyor chain are sealed by resilient washers of elastic deformable material, such as rubber or synthetic rubber, these sealing washers being prevented from being squeezed out from between the links after protracted use, this squeezing out being prevented by providing the washers with metal reinforcements inside the washers.

Another object is to provide a flight conveyor wherein the pivot pins and conveyor chain links are securely attached to one another by connections which will not separate in the event of breakage or will not work their way out of their engagement with the links, this connection being provided by snap rings lodged in grooves in the ends of the pivot pins and in recesses in the ends of the outer links, the walls of the recesses overhanging the snap rings in such a manner as to prevent escape of the snap rings, even if broken.

Another object is to provide a flight conveyor which is especially well adapted for high temperature installations at temperatures beyond the endurance of rubber or synthetic rubber, a resilient connection between the links being provided by spring washers of slightly cupped form which will withstand such high temperatures.

This application is a division of my co-pending application Serial No. 177,287 filed August 2, 1950 for Flight Conveyor, now Patent No. 2,667,790 granted February 2, 1954.

In the drawings:

Figure 1 is a top plan view of a portion of a flight conveyor, according to one form of the invention, with the peripheral portion of one of the flights partly in section;

Figure 2 is a side elevation of the flight conveyor shown in Figure 1, with the junction of the conveyor flight and chain shown in section;

Figure 3 is a cross-section taken along the line 3—3 in Figure 2;

Figure 4 is a cross-section taken along the line 4—4 in Figure 2, showing the reinforced resilient sealing washers and the recessed snap rings used for holding the pivot pin and links in assembly;

Figure 5 is a cross-section taken along the line 5—5 in Figure 4, with a portion of the sealing washer in section;

Figure 6 is a cross-section through a modified sealing washer adapted to be used in place of the sealing washers shown in Figures 4 and 5;

Figure 7 is a diagrammatic plan view of the central portion of Figure 1, showing the manner in which the conveyor chain is assembled or disassembled;

Figure 8 is a cross-section similar to Figure 4, taken along the line 8—8 in Figure 10, showing a modified conveyor link and pivot pin connection which is especially well adapted to high temperature installations beyond the endurance of rubber;

Figure 9 is a cross-section along the line 9—9 in Figure 8, showing one of the spring washers; and Figure 10 is a side elevation of the modified flight conveyor construction shown in Figure 8, with the conveyor flight and its associated structure in central vertical section.

Hitherto, the use of flight conveyors in installations subjected to gas or liquid pressure requiring extreme cleanliness has been a serious problem because of the difficulty of providing a pressure-tight and recess-free connection between the conveyor flights and conveyor chain. Flight conveyors hitherto used in such installations have not only leaked pressure at the junction between the flights and the conveyor chain links to which they are attached, but have also provided recesses in which particles of the conveyed material might lodge, this condition, in the case of food processing installations, causing decay and the growth of bacteria.

Furthermore, the sealing of the joints between the links of the conveyor chain and the pivot pin has also hitherto been a troublesome problem in view of the fact that sealing washers of elastic deformable material, such as rubber or synthetic rubber, eventually are squeezed out from between the links by the constant pressure exerted upon them, with the result that the consequent thinning of the washers caused them to cease adequately to fill the gaps between the links, thereby opening up crevices for the lodging of conveyed material and foreign matter or bacteria.

Furthermore, where the links and pivot pins of the conveyor chain were held in assembly by fasteners in the form of snap rings, the latter in the course of time tended to work their way out of the annular groove in which they were seated in the pivot pins, releasing the pivot pins and consequently resulting in a parting of the conveyor chain. Moreover, the breakage of such snap rings accomplished the same result of parting the conveyor chain and therefore resulting in a breakdown of the entire apparatus. Finally, the use of such conveyors in high temperature installations brought about more difficulties because of the inability of the rubber or synthetic rubber to endure such temperatures.

The present invention provides a tight seal of the flights onto the conveyor chain links by the use of mating internal and external tapers on the flights and links respectively, the flights being held in place by fasteners securing them to lugs or abutments on the conveyor chain links. The links are attached to one another by pivot pins which, in turn, are held in place by fasteners, such as snap rings, seated in annular grooves in the pivot pins and also in annular recesses in the ends of outer metal washers. The recessed outer washers and links are forced outward by means of resilient inner washers interposed between the links in a compressed condition so as to push the links and outer washers outward, covering the snap rings. The inner washers are preferably of natural or synthetic rubber, with internal metal reinforcements to prevent them from being squeezed outward from between the links. For high temperature installations, metallic spring washers are used in place of the natural or synthetic rubber washers.

It is also evident from Figures 2 and 10 that the off-center placing of the tapered link-receiving holes in the flights of the conveyor of the present invention causes the weight of the chain to maintain the flights in an upright position. As a consequence, wear on the flights resulting from their horizontal travel to the conveyor conduit results in the wear being heavier at the bottom edge of the flight which is nearest the conveyor chain, because it is this portion of the flight which slides along the bottom of the conveyor conduit. It will be evident from Figures 2 and 10 that the worn flights of the conveyor of the present invention may be quickly and easily removed and replaced with new flights merely by removing the fastener, hammering or pressing the worn flight along its bar link toward the smaller end of the taper, and replacing it by a new flight which is then fastened in position by replacing the same or a new fastener. It is also evident that the tapered hole and flight link taper, being of polygonal cross-section, prevent undesired rotation of the flights relatively to the chain, so that the flights can never get out of line, as would be the case with an eccentrically-mounted flight having a circular hole receiving a link taper of circular cross-section.

Referring to the drawings in detail, Figures 1 to 5 inclusive, show a flight conveyor, generally designated 10 and consisting generally of flights 11 mounted upon a conveyor chain 12. The conveyor chain 12 in turn consists of inner and outer links 13 and 14 respectively, with resilient inner sealing washers 15 interposed between the links 13 and 14 and between the links 14 and outer metallic washers 16. The links 13 and 14 and washers 15 and 16 are pivotally mounted on pivot pins 17 which pass through the bores 18, 19 and 20 respectively of the inner and outer links 13 and 14 and outer washers 16 (Figure 4). The pivot pins 17 near their opposite ends 21 are provided with annular grooves 22 in which are mounted fasteners such as split annular snap rings 23. Approximately half of each snap ring 23 is seated in the groove 22 and the other half is seated in an annular recess or counterbore 24 at the outer end of the bore 20 of each outer washer 16. The counterbore 24 is of approximately the same depth as the axial thickness of the snap ring 23 so that when the washer 16 is pushed outward to its fullest extent along the pivot pin 17, the periphery of the snap ring 23 will be fully covered by the counterbore 24 of the washer 16. Thus, the snap rings 23 are held in position by the outer washers 16 and prevented not only from working loose, as they otherwise frequently do, but also from coming out in pieces if they break while in service. In this way, costly breakdowns in the conveyor from these causes are effectively prevented. Each snap ring 23 has opposite ends 26 separated by a gap 27.

The resilient sealing washers 15 (Figure 4) are preferably composed of elastic deformable material, such as rubber or synthetic rubber and have peripheral portions 30 and inner central portions 31 which are thinner than the peripheral portions 30 by reason of counterbores or recesses 32 formed therein on opposite sides thereof (Figure 4). Molded into each resilient washer 15 is an annular reinforcing disc 33, preferably of metal such as ordinary or spring steel. The reinforcement discs 33 are bonded to the washer portions 31 and 30 and prevent the peripheral portions 30 from being squeezed outward excessively during the use.

The inner links 13 at approximately their midportions are provided with tapered portions 37 of approximately frusto-pyramidal form (Figures 3 and 10), the opposite end portions 38 and 39 of the inner links 13 being narrower than the portions 37. Disc-like lugs or abutments 40 are mounted eccentrically on the end portions 39 of the inner links 13 adjacent the tapered portions 37 (Figures 1 and 2) and are bored as at 41 to receive fasteners 42, such as bolts or rivets which pass through holes 42a in flight discs 43 of elastic deformable material such as rubber or synthetic rubber. The central portions of the flight discs 43 are provided with tapered holes 44 of frusto-pyramidal form corresponding in size and shape to the tapered portions 37 of the inner links 13 and mating therewith. The flight discs 43 are recessed or countersunk as at 44 on their opposite faces 45 to receive clamping discs or plate 46 of steel or other suitable material. The lugs 40 may be formed integrally with the inner links 13, as by casting or forging or they may be prepared separately and welded in position, as is found most convenient. They are conveniently tapered as at 47 at their peripheries so as to thin them down toward their outer edges.

The modified inner sealing washer 50 of Figure 6 is similar in purpose and mode of operation to the inner sealing washers 15 of Figure 4, but is of slightly different construction. In place of the plain reinforcing discs 33 of the washer 15, the washer 50 has a central portion 51 in which are embedded reinforcement discs 52 having oppositely-directed peripheral flanges 53 seated in the peripheral portions 54 of the washer 50. The washers 50 have counterbores 55 and central holes 56 which are, of course, aligned with the holes 57 in the reinforcement discs 52.

In the operation of the flight conveyor 10 of Figures 1 to 5 inclusive, the conveyor 10 is mounted in a suitable conduit and driven by a sprocket chain or other suitable driving mechanism. Since the resilient sealing washers 15 are assembled in a compressed condition in the manner set forth below, their resilience not only seals the gaps between the inner and outer links 13 and 14 and between the outer links 14 and outer washers 16 (Figure 4), but also forces the outer washers 16 outward so that the walls of their counterbores 24 overlie the snap rings 23 and prevent them from becoming dislodged or working out of their grooves 22, even though they become broken. Consequently, also, no dust, bacteria or conveyed material can get into the spaces between the links 13 and 14. Moreover, since the flight discs 43 are tightly wedged upon the tapered portions 37 of the inner links 13 in mating relationship, no such material or foreign matter can get between the flights 11 and links 13.

To disassemble the conveyor chain 12, the jaws 58 of a vise or clamp 59 are drawn toward one another against the outer links 14 (Figure 7), further compressing the sealing washers 15 and exposing the snap ring 23 at one end 21 of the pivot pin 17. The snap ring 23 can then be removed from its annular groove 22 by inserting a tool in the gap 27 between its opposite ends 26 and expanding the snap ring 23 until it slips over the end 21 of the pivot pin 17. The conveyor chain 12 is assembled by reversing the foregoing procedure.

The modified flight conveyor 60 of Figures 8, 9 and 10 is especially adapted for high temperature installations where rubber, synthetic rubber or the like will not stand up. It consists, as before, of flights 61 mounted on a conveyor chain 62, the latter having inner and outer links 63 and 64 (Figure 8) separated by spring washers 65 from one another and from the outer washers 66. The pivot pins 67 resemble the pivot pins 17 of Figure 4 and are similarly provided with end grooves 68 adapted to receive the inner portions of snap rings 69, the outer portions of which are seated in annular recesses 70 in the outer washers 66, as before.

The spring washers 65 (Figures 8 and 9) are in the form of cupped discs having central and peripheral portions 71 and 72 respectively interconnected by approximately conical portions 73 (Figure 9). Slots 74 are formed radially at intervals around the periphery of the washers 65 so as to enhance the resilience thereof. The washers 65 have central holes 75 for receiving the pivot pins 67. The spring material of which the spring washers 65 are made consists of steel of a composition adapted to retain its resilience at the high temperature at which it is intended to be used and such steels are well-known to skilled workers in the steel-making art.

Each inner link 63 of the conveyor chain 62 is provided with a tapered portion 76 extending from one end portion 77 to an enlarged intermediate portion 78, the inner link 63 beyond the enlarged intermediate portion 78 terminating in a tapered end portion 79 (Figure 10). Mounted on the enlarged intermediate portion 78 of the inner link 63 and secured thereto by welding as at 80, is the hub 81 of a disc-like lug or abutment 82. The hub 81 has a hole 83 of approximately rectangular cross-section therein of the same size and shape as the intermediate portion 78 so as to fit snugly thereon. The lugs or abutments 82, like the lugs or abutments 40, are mounted eccentrically upon the links 63, and are bored as at 84 to receive fasteners 85 passing through the similarly bored holes 86 in the flight discs 87. The latter are preferably of metal.

The assembly and operation of the modified flight conveyor 60 is substantially the same as that of the first form shown in Figures 1 to 8 inclusive, except for the different action of the spring washers 65. These do not seal the spaces between the links 63 and 64 and washers 66 but do provide the resilience necessary in holding the snap rings 69 in their respective inner and outer recesses 68 and 70. The chain 62 is disassembled in a manner substantially identical with that shown and described in connection with Figure 7, and hence requires no additional description.

Where the conveyor 10 or 60 is used in food industries or chemical industries, stainless steel may be used for its component parts. The use of stainless steel provides a construction which is easily cleaned and kept clean.

Certain materials, when conveyed, attack rubber or synthetic rubber and cause it to swell or otherwise deteriorate. Under such circumstances, a natural or synthetic rubber flight bonded to its support is unsatisfactory. When these conditions are encountered, therefore, it is preferred to use a flight of plastic material other than natural or synthetic rubber which is not bonded to its support but is held in position by the clamping plates or discs 46.

What I claim is:

1. A flight conveyor comprising a flexible conveyor chain composed of outer and inner links pivotally connected to one another, certain of said inner links each comprising an elongated bar having pivot bores disposed at its opposite ends, a tapered portion disposed in the intermediate part thereof, a plate-shaped abutment disposed adjacent the larger end of said tapered portion; a circular disc flight having a tapered hole therethrough spaced away from the center and disposed near the periphery thereof, said hole corresponding in configuration and taper to said tapered portion and snugly mounted thereon in mating engagement therewith, and fastening means securing said abutment and flight together.

2. A flight conveyor comprising a flexible conveyor chain composed of outer and inner links pivotally connected to one another, certain of said inner links each comprising an elongated bar having pivot bores disposed at its opposite ends, a tapered portion disposed in the intermediate part thereof, a plate-shaped abutment disposed adjacent the larger end of said tapered portion; a circular disc flight having a tapered hole therethrough of polygonal cross-section spaced away from the center and disposed near the periphery thereof, said hole corresponding in configuration and taper to said tapered portion and snugly mounted thereon in mating engagement therewith, and fastening means securing said abutment and flight together.

3. A flight conveyor comprising a flexible conveyor chain composed of outer and inner links pivotally connected to one another, certain of said inner links each comprising an elongated bar having pivot bores disposed at its opposite ends, a tapered portion of rectangular cross-section disposed in the intermediate part thereof, a plate-shaped abutment disposed adjacent the larger end of said tapered portion; a circular disc flight having a tapered hole of rectangular cross-section therethrough spaced away from the center and disposed near the periphery thereof, said hole corresponding in configuration and taper to said tapered portion and snugly mounted thereon in mating engagement therewith, and fastening means securing said abutment and flight together.

References Cited in the file of this patent

UNITED STATES PATENTS

| Number | Name | Date |
|---|---|---|
| 157,173 | Hamlin | Nov. 24, 1874 |
| 170,824 | Davis | Dec. 7, 1875 |
| 180,465 | Daugherty | Aug. 1, 1876 |
| 185,350 | Phelps | Dec. 12, 1876 |
| 202,896 | Valentine | Apr. 23, 1878 |
| 231,186 | Neacy | Aug. 17, 1880 |
| 499,525 | Dodge | June 13, 1893 |
| 811,190 | Webster | Jan. 30, 1906 |
| 2,138,317 | Weiss | Nov. 29, 1938 |
| 2,409,318 | Sivyer | Oct. 15, 1946 |